United States Patent

[11] 3,586,768

[72] Inventor Kingston E. Ganske
Columbus, Ind.

[21] Appl. No. 556,099
[22] Filed June 8, 1966
[45] Patented June 22, 1971
[73] Assignee Arvin Industries, Inc.
Columbus, Ind.

[54] MAGNETIC RECORDING AND REPRODUCTION WITH POLARITY INVERSION DURING ALTERNATE LINE PERIODS
6 Claims, 6 Drawing Figs.

[52] U.S. Cl. .......... 178/6.6, 178/6.8, 179/100.2
[51] Int. Cl. .......... H04n 5/78, H04n 7/12
[50] Field of Search .......... 178/6.6 A, 6; 179/100.2

[56] References Cited

UNITED STATES PATENTS

| | | | |
|---|---|---|---|
| 2,281,891 | 5/1942 | Terry | 178/7.1 |
| 2,867,685 | 1/1959 | Johnson | 178/6.6 |
| 3,403,231 | 9/1968 | Slaton | 179/100.2 |

*Primary Examiner*—Bernard Konick
*Assistant Examiner*—Howard W. Britton
*Attorney*—Marechal, Biebel, French and Bugg

ABSTRACT: A process and apparatus are disclosed for magnetically recording and producing electrical signals of a frequency range from DC to several megacycles. The signal to be recorded is first regularly inverted at a rate corresponding to a chosen frequency within the optimum range of the recording media and associated recording and playback transducers, producing a signal to be recorded which is regularly inverted and noninverted at such chosen rate. This signal is recorded on a magnetic recording media, is later played back, and upon playback the inverted portions are restored to recreate the signal in its original form, and the restored signal is then reproduced.

INVENTOR.
KINGSTON E. GANSKE
BY
Marechal, Biebel, French & Bugg
ATTORNEYS

MAGNETIC RECORDING AND REPRODUCTION WITH POLARITY INVERSION DURING ALTERNATE LINE PERIODS

This invention relates to improved apparatus, and to a novel method, for magnetic recording, having particular utility in, but not limited to, the recording and playback of television signals.

Various difficulties are encountered in recording and playback of signals which vary over a wide range of frequencies, particularly from DC or near DC (a few cycles per second) upward to several megacycles. These difficulties are introduced for example by reason of nonlinearities in the playback heads (transducers) and the recording media (usually coated magnetic tape), cross talk between adjacent recordings on the media, playback noise, and mechanical and electronic complications introduced by efforts to overcome these difficulties.

The reproduction ability of the recording media, i.e. magnetic tape is amplitude nonlinear and, unless a DC reference is carried to the head, nonsymmetrical signals will not be recorded at a proper reference. The playback transducers, or heads, are subject to output nonlinearity, typically in the order of 6 decibels per octave, the output decreasing with decrease in frequency. Compensation for these characteristics can be introduced to some extent by constructing amplifiers having response characteristics which are complementary to these known deviations, with the purpose of obtaining a flat response. But at the lower frequencies the amplifier must have its highest gain, and consequently increases noise. Presently available direct recording systems are limited for these and other reasons, to covering a frequency spectrum of about nine octaves.

It is possible to overcome these recording and playback limitations by using FM or AM carrier systems, but these become very complex and expensive systems, and in fact have their own problems and limitations.

As recording wavelengths approach DC the flux path of the magnetized segments of the recording media spread. For example, the vertical interval of a recorded television video signal is a pulse lasting as much as 600 microseconds, and hence can be considered as at much lower frequency than the remainder of the recorded signal. Also lower frequency components of picture information are of the same nature. In order to minimize crosstalk between adjacent recordings on the media, it has been found desirable to space the recording tracks apart, by a distance sufficient to substantially eliminate the flux paths from one track affecting the track being monitored, thereby wasting otherwise useful space on the recording media. On the other hand, with presently available systems this spacing is necessary, particularly in video recording, otherwise crosstalk will introduce spurious vertical blanking signals from adjacent tracks and thereby destroy or disrupt the signals being played back.

It is possible to improve low frequency signal to noise ratio by increasing the tape speed and making changes in head design and electronics, however this adds complicity and expense, and requires excessive amounts of recording tape.

SUMMARY OF THE INVENTION

The primary object of this invention is to provide a novel, relatively simple, and relatively inexpensive method and apparatus for magnetic recording and playback which is capable of faithful reproduction of recorded signals over a frequency range from DC to as high as in excess of two megacycles.

A further object of the invention is to provide a novel method and apparatus for magnetic recording and playback in which low frequency signal to noise ratio is improved, in which nonsymmetrical signals are recorded at a fixed position on the tape magnetization curve regardless of signal symmetry changes, and in which cross talk between adjacent recording tracks is minimized.

Another important object of the invention is to provide a novel magnetic recording and playback method and apparatus which is particularly suitable for reproduction of video signals.

Another object of the invention is to provide such a reproduction system which is capable of employing presently available recording media, such as high fidelity magnetic recording tape, and stationary recording and playback heads, all operating at conservative speeds.

Another object of the invention is to provide a novel magnetic reproduction system which is capable of recording and playing back signals over a much greater frequency spectrum than presently available systems, and which has utility in various application such as instrumentation and/or audio recording and replay, employing similar circuitry to that which is suitable for reproduction of video signals.

A further object of the invention is to provide a magnetic reproduction system operable over a wide frequency range upward from DC, in which the signal to be recorded is first regularly inverted and reinverted at a rate equal to the lowest frequency which is predetermined to be within the optimum operating range of the transducers and recording media, wherein the resultant signal is then magnetically recorded, and wherein the recorded signal is played back and the inverted portions are reinverted to restore the signal to its original condition, and the restored signal is then replayed.

A more specific object of the invention is to provide a magnetic reproduction apparatus and method for handling video signals, wherein the regular inversion and reinversion of signals to be recorded is keyed to occur simultaneously with the horizontal sync signals, whereby the signal for producing one line of video information is inverted with respect to the signal for the preceding and succeeding lines, and thereby to limit the lowest frequency recorded to the frequency of horizontal sync signals, and any portions of the original signal having a lower frequency are recorded as inverted and noninverted signal levels at the horizontal sync signal frequency.

Other objects of the invention will be apparent from the following description, the accompanying drawings and the appended claims.

DESCRIPTION OF A PREFERRED EMBODIMENT

Figure 1:
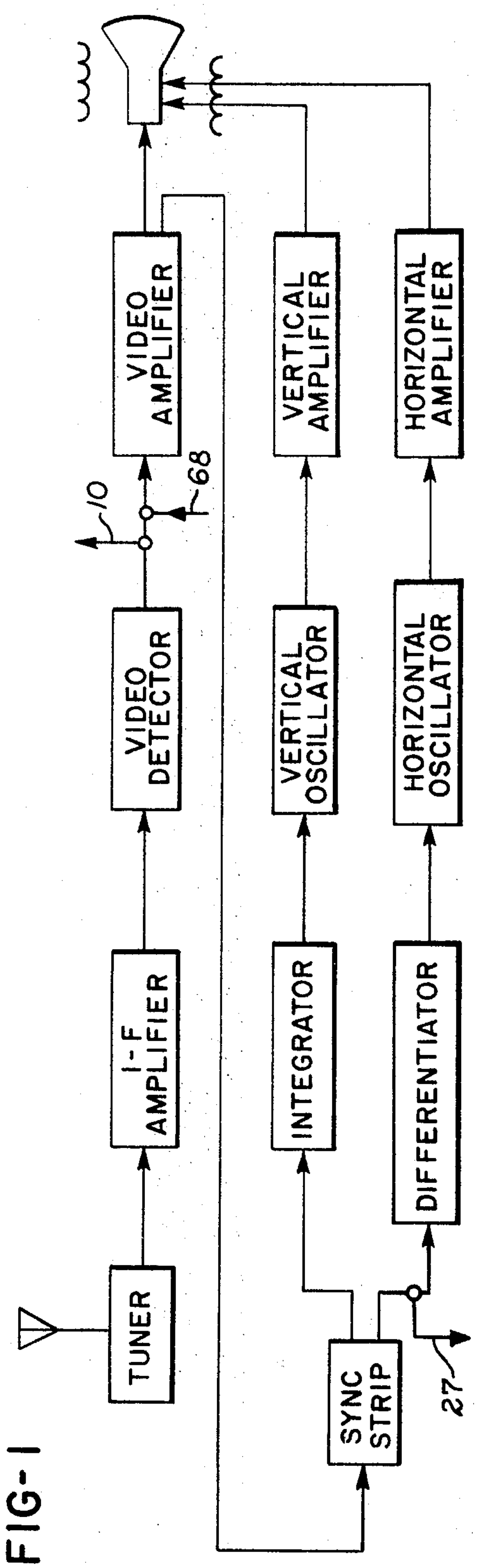
FIG. 1 is a block diagram of a typical television receiver, which is representative of the type of use to which the invention can be put.
Figure 6:
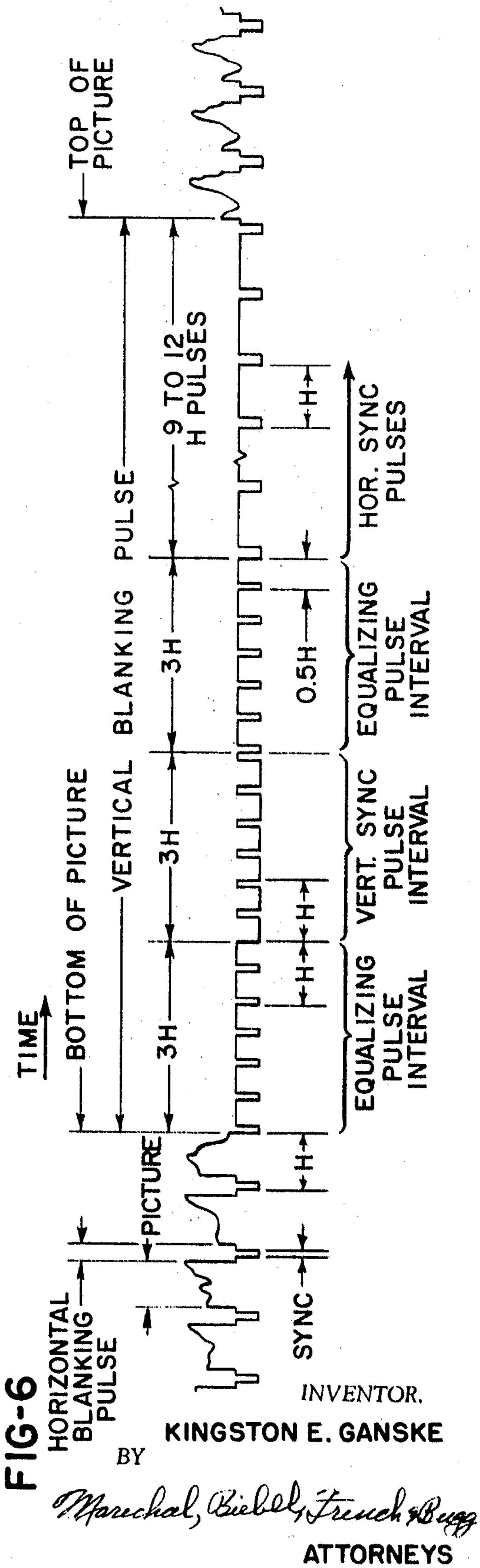
FIG. 6 is a diagram of a typical video signal which can be successfully recorded and reproduced by the method and apparatus of this invention.

Referring to the drawings, which illustrate a preferred embodiment of the invention, and particularly with reference to FIG. 1, which shows in block diagram form a typical television receiver, the wave form of the output of the detector circuit can be represented generally as in FIG. 6. As is well known, there is a horizontal blanking and sync signal following the video signal for each line, and the horizontal sync provides a triggering function by which the cathode ray beam in the picture tube is caused to retrace rapidly before scanning the next line. The level of the signals is representative of the intensity of the cathode ray beam, between all white and all black, and as is noted and well known, the horizontal blanking signal is equivalent to approximately 100 percent black, and the horizontal sync pulse is of a greater amplitude which is referred to as "blacker than black."

The length of the vertical interval and other low frequency video information is substantial (FIG. 6) and, as previously mentioned, requires a rather large guard band between tracks on a recording tape in order to avoid cross talk with adjacent tracks. Therefore, with presently known systems, crosstalk of this nature is undesirable since partial reproduction of a vertical interval and other low frequency video information from an adjacent track on a recording will cause interference in the video signals from the track being read to the television set during replay, with the result that the picture will be garbled and unacceptable.

In accordance with the invention, detected video input signals, for example to the video amplifier circuit as shown in FIG. 1, are subjected to an alternative inversion, whereby signals to be recorded are effectively separated into negative and positive signals. In the recording and replay of television signals, it has been found convenient to match the frequency of inversion and reinversion to the frequency of the horizontal sync signals. In commercial television systems this frequency is 15.75 kilocycles. As a result of this continuous inversion and reinversion prior to recording, the lowest frequency which the recording and replay transducers must handle is the inversion frequency, i.e. about 7.8 kilocycles. By limiting the recording frequency in this manner to avoid low recorded frequencies, it is possible to simplify the recording amplifiers and to utilize the recording and playback transducers over a range where they are most effective and least subject to distortion, and to permit closer spacing between adjacent tracks.

Figure 2:
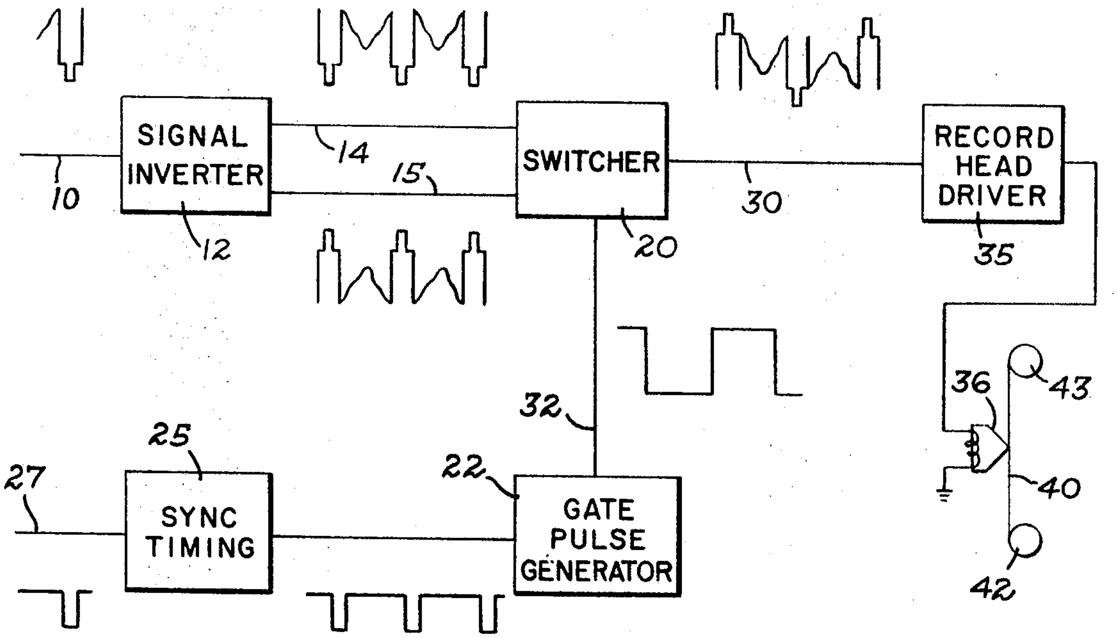
FIG. 2 is a block diagram of a recording system constructed according to the invention.
Figure 3:
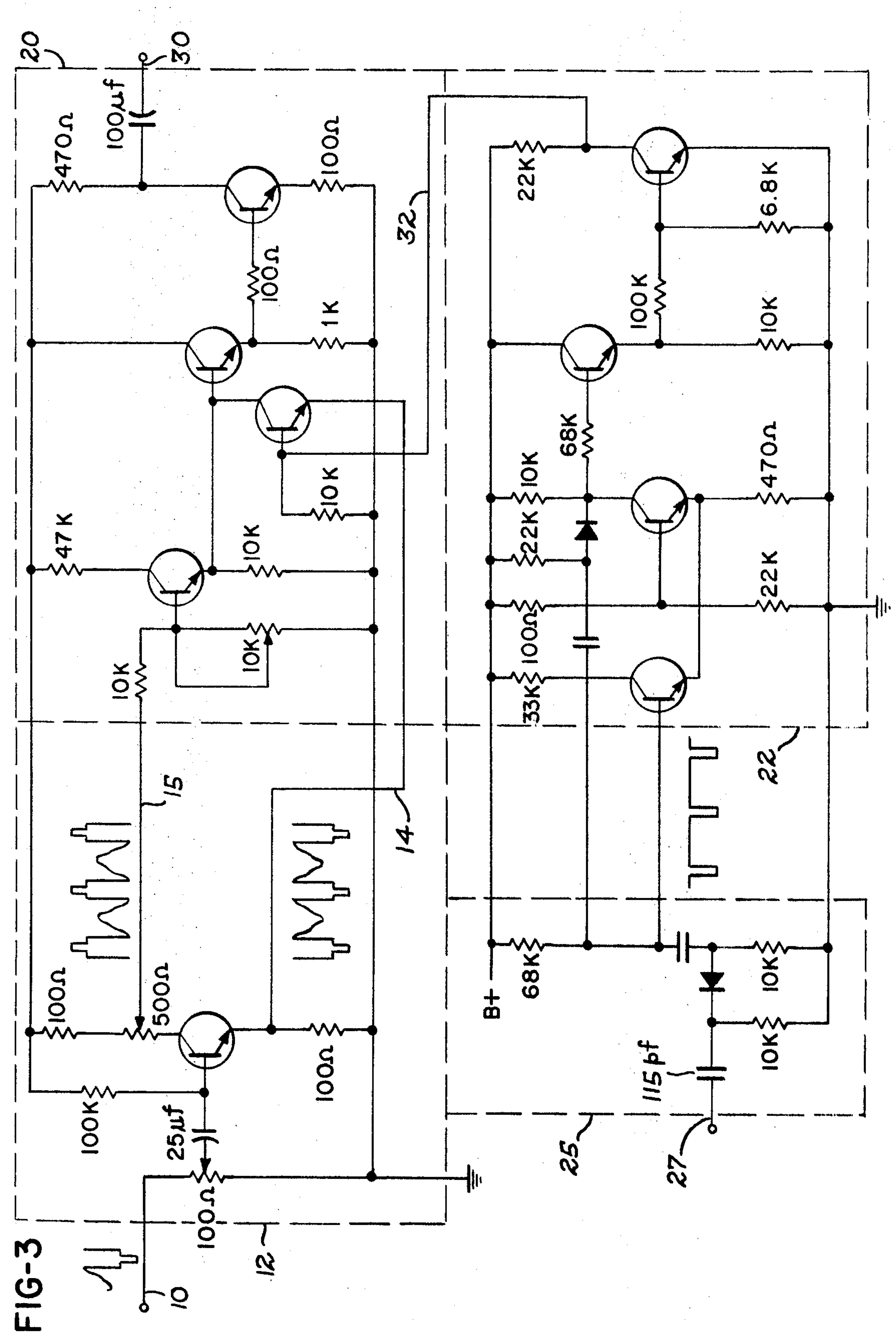
FIG. 3 is a schematic diagram of the recording system, including typical wave forms such as would be handled and recorded in video recording.

FIG. 2 shows in block diagram form, a typical video input signal on line 10, which may be taken for example from the input to the video amplifier as shown in FIG. 1. This signal is applied to an inverter circuit 12, details of which are shown in FIG. 3. The signals as received are presented on output line 14, without inversion, and a second output line 15 presents the received signals completely inverted, as indicated by the representative video signal wave forms on FIGS. 2 and 3. Both the original and the inverted signals are applied, through lines 14 and 15, to a switching circuit 20, details of which appear on FIG. 3. This switching signal is keyed from a gate pulse generator 22, and this pulse generator in turn is keyed by the sync timing circuit 25, which may in turn receive keying signals from the sync control circuits of the television receiver, through line 27.

The purpose of the sync timing circuitry is to assure that the gate pulse generator 22 accurately causes the desired inversion and reinversion at every horizontal blanking signal, at the proper time. The switching preferably occurs coincidentally with the end of the horizontal blanking signal, sometimes referred to in the art as the "backporch" portion of the horizontal blanking signal, in other words that part following the horizontal sync pulse. Thus, the gate pulse generator output on line 32 is applied to the switching circuit 20, for example as shown in FIG. 3, with the result that the output 30 is rapidly switched between the two inputs 14 and 15. The resultant output signal may be of the type shown by the wave form above line 30 on FIG. 2. This signal is applied to the recording head driver circuit 35, which may be a conventional driver circuit for a magnetic recording head, and its output leads to the recording head or transducer 36, which in turn causes the signals to be recorded on the recording media, such as the magnetic tape 40 which is driven past the recording head from the supply reel 42 to the take up reel 43.

Figure 4:
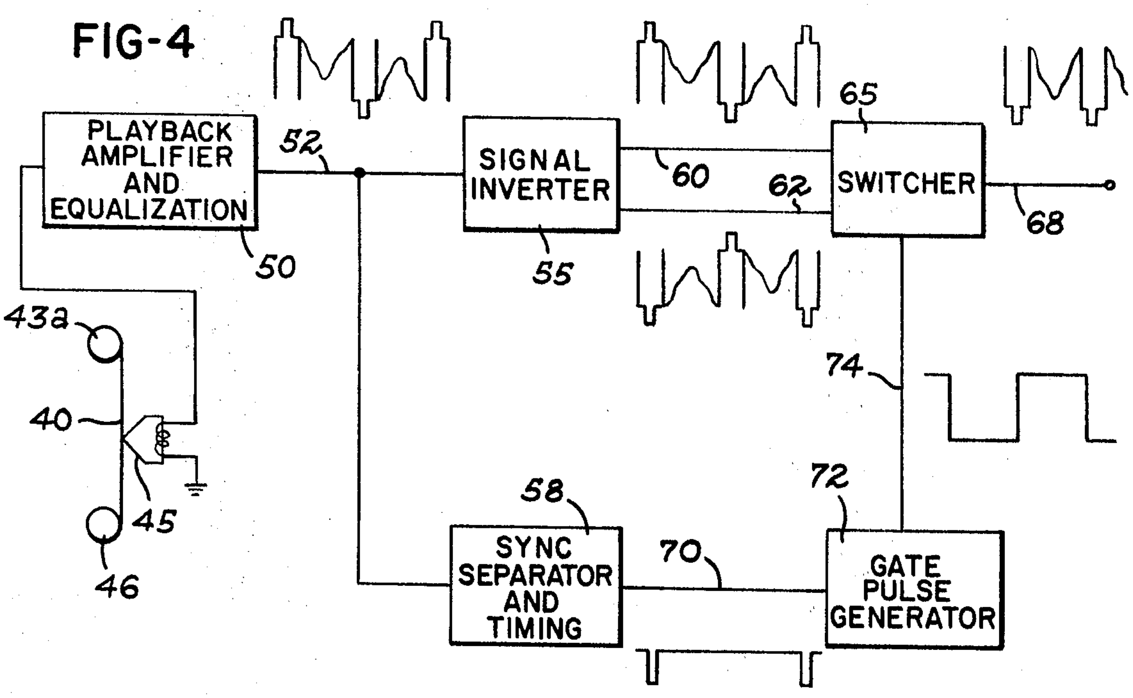
FIG. 4 is a block diagram of a playback system according to the invention.

In order to replay this recorded signal it is of course necessary to reinvert those portions of the original input signal which have been inverted. In the case of video recording this means inverting signals as necessary for every other line while faithfully reproducing the horizontal blanking signals and sync pulses. FIG. 4 is a block diagram of a typical playback arrangement for this purpose. The recording media or tape 40 is traversed past a playback transducer or head 45, moving from the supply reel 43*a* to the take up reel 46.

Figure 5:
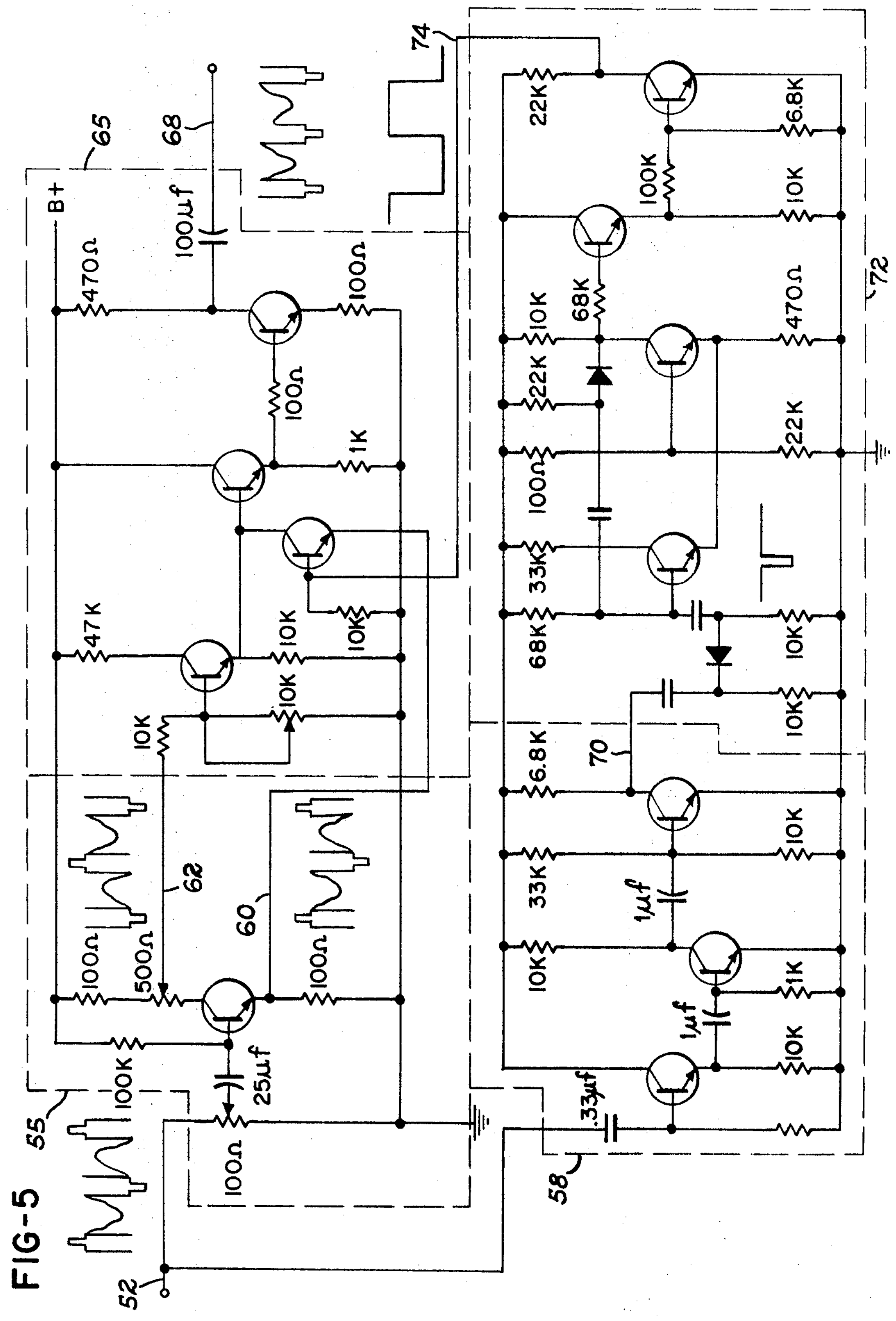
FIG. 5 is a schematic diagram of a typical playback system.

The output of the playback head 45 is directed to a conventional playback amplifier 50, which incorporates equalization circuits for the particular playback head. The output of the playback amplifier on line 52, is directed to an inverter circuit 55 and also to a sync separator and timing circuit 58. Details of typical inverter circuits and separator circuits are shown in FIG. 5, with the wave forms of their respective outputs indicated. Similarly to the signal inverter in the recording apparatus (actually the inverting circuit may be the same as will be noted by comparing circuit 12 on FIG. 3 with circuit 55 on FIG. 5), the inverter circuit 55 provides two outputs on lines 60 and 62 respectively. The former is the same signal as received from line 52, and the signal on line 62 is completely inverted.

These signals are applied to the switching circuit 65 which is adapted to combine portions of each in order to produce a faithful reproduction of the original signal on its output line 68. This output line in turn can be connected to the input of the video amplifier in a television receiver, as shown in FIG. 1, or to any other suitable playback equipment where other types of signals are being reproduced. The sync separator and timing circuit 58 is adapted to detect the horizontal sync signals from the input on line 52, and to produce therefrom keying signals on line 70, which in turn keys a gate pulse generator circuit 72. Its output 74 is, in effect, a square wave switching signal which controls the switching circuit 65 to switch the output 68 between the original and the inverted inputs 60 and 62, thereby restoring the inverted signal to its original condition, such as received at line 10 on the recording system, FIG. 2.

With the present invention, in spite of the fact that the input signal can vary in the case of television signals from DC to several megacycles, the frequency of the signals actually recorded and played back is over a range from about 7.8 kilocycles to several megacycles. This permits the magnetic recording system to handle signals well beyond the normal frequency span of about nine octaves. Furthermore, the recorded signal requires only a minimum amount of recording tape, and the size of the guard band between adjacent recording tracks has been substantially reduced in size while still avoiding crosstalk between adjacent tracks.

The principles of the invention are applicable to other types of recording than television recording and playback. As previously mentioned, the invention has utility in various other applications such as instrumentation and/or audio recording systems. Those skilled in the art will recognize that appropriate changes in circuit values or in circuit design of the inverting, switching, and controlling circuits disclosed herein can readily be provided for such other applications. For in circuit the principles of this invention are useful in the recording of digital information where the wave form for any single digit may have the same amplitude, but be of shorter or longer time length. By regularly inverting and reinverting such a signal, the longer time span signals can be regularly inverted such that the minimum recorded frequency is within optimum capability of the recording media and the playback transducers, in particular. The same principle can be applied to audio recording where very low frequency signals, for example below 100 cycles per second, can be regularly inverted and the actual minimum recorded frequency being that of the inversion frequency.

In such systems, since a timed control signal for inversion probably will not be available inherently, it is possible to generate a suitable control signal which will control the regular inversion and reinversion of the recorded signal. The frequency of this control signal may differ depending upon the results desired, suitable values being in the range of 100-—5000 cycles per second. For convenience, this control signal can be recorded on a separate track adjacent to the actual signal which would be reproduced, thereby simplifying the playback arrangements where the control signal must be reproduced to reinvert the inverted portions of the recorded signals, or it can be recorded on the same track in a number of known ways.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What I claim is:

1. In a magnetic recording system for recording and reproducing electrical signals such as television signals including video information and horizontal and vertical sync signals over frequency range greater than the normal system capability, the combination of an input circuit adapted to receive signals to be recorded, an inverter connected to said input circuit, a switching circuit having inputs connected to said input circuit and to said inverter and an output over which either of said inputs is selectively available, a sync timing circuit keyed by said horizontal sync signals, a gate pulse generator keyed by said sync timing circuit and connected to regulate the rate of switching of said switching circuit to invert regular portions of the entire video signal, at a rate corresponding to the horizontal sync pulses, on the output from said switching circuit to said recording transducer, and a recording transducer connected to said switching circuit output to record the signals in alternately inverted and direct form on a magnetic recording media whereby essentially the lowest frequency recorded is the frequency of operation of said timing circuit.

2. A magnetic recording system as defined in claim 1, wherein said gate pulse generator is arranged to produce a constant switching output to said switching circuit at one-half half the repetition rate of the horizontal sync signals.

3. A magnetic recording system as defined in claim 2, further including a playback transducer for reproducing the signal recorded on said media, a second inverter receiving the output of said playback transducer, a second switching circuit having an output for transmitting a signal for reproduction and having inputs from said second inverter carrying the recorded signal as recorded and in inverted form, and a sync separator and timing circuit receiving the signal from said playback transducer and connected to drive said second switching circuit at the same switching frequency as said first switching circuit to reinvert those portions of the original signal which were inverted for recording purposes prior to reproduction.

4. The process of expanding the useful frequency span of a magnetic recording system beyond the normal span of about nine octaves to a span from DC to in excess of two megacycles, suitable for recording and reproducing a television signal, comprising:

a. receiving a signal to be recorded and regularly inverting the signal at a frequency within the frequency range of the signal to be recorded and substantially below the highest frequency to be recorded to provide signals for recording in both inverted and noninverted form,
b. generating a switching signal at a constant frequency within the normal span of the system,
c. recording on a magnetic recording media alternatively from the inverted and noninverted signal sources using the switching signal to control which source is employed,
d. reproducing the recorded signal,
e. sensing the regular pattern of inversion in the reproduced signal, and
f. employing the thus sensed inversion pattern to reinvert the inverted portions prior to use of the playback signal, whereby essentially the lowest frequency actually recorded is the frequency of the switching signal and the reproduced signal can include substantially lower and higher frequencies.

5. The process defined in claim 4, wherein the signal to be recorded incorporates video and related signals varying from DC to over one megacycle, the switching signal of step (*b*) being at a rate corresponding to one-half the horizontal sync signals of the television signal, whereby video signals for successive lines are inverted with respect to preceding and succeeding lines, and vertical blanking signals are subdivided at the frequency of inversion corresponding to said switching signal.

6. The process of claim 5, including the step of employing the horizontal sync signals from the original video signal to key a constant frequency gate pulse generator controlling an inverter switching device for recording, sensing the recorded signal and reproducing therefrom a timing signal, and employing such timing signal to control the reinversion during playback of the recorded signal.

PO-1050
(5/69)

UNITED STATES PATENT OFFICE
CERTIFICATE OF CORRECTION

Patent No. 3,586,768 Dated June 22, 1971

Inventor(s) Kingston E. Ganske

It is certified that error appears in the above-identified patent and that said Letters Patent are hereby corrected as shown below:

Column 4, lines 49-50, delete "For in circuit" and substitute --For example,--.

Column 5, line 31, delete "half" at the beginning of the line.

Signed and sealed this 13th day of February 1973.

(SEAL)
Attest:

EDWARD M.FLETCHER,JR.
Attesting Officer

ROBERT GOTTSCHALK
Commissioner of Patents